United States Patent

[11] 3,630,764

[72] Inventor: Richard F. Shannon, Lancaster, Ohio
[21] Appl. No.: 789,945
[22] Filed: Jan. 8, 1969
[45] Patented: Dec. 28, 1971
[73] Assignee: Owens-Corning Fiberglas Corporation
Continuation-in-part of application Ser. No. 583,064, Sept. 9, 1966, now abandoned, which is a continuation-in-part of application Ser. No. 378,216, June 26, 1964, now abandoned, which is a continuation-in-part of application Ser. No. 132,827, Aug. 21, 1961, now abandoned. This application Jan. 8, 1969, Ser. No. 789,945

[54] FIRE-RESISTANT PAINT
5 Claims, No Drawings

[52] U.S. Cl. .................................................. 106/15, 106/16, 106/18, 106/241, 106/251, 117/137, 260/40, 260/41
[51] Int. Cl. ........................................................ C09d 5/18
[50] Field of Search ............................................ 106/15 FP, 16, 18, 241, 251; 260/40, 41; 117/137

[56] References Cited

UNITED STATES PATENTS

| | | | |
|---|---|---|---|
| 2,754,217 | 7/1956 | Allen et al. .................. | 106/15 |
| 3,207,588 | 9/1965 | Slayter et al. ................ | 106/40 |
| 3,449,161 | 6/1969 | Hindersinn et al............ | 106/15 X |

Primary Examiner—Lorenzo B. Hayes
Attorneys—Staelin & Overman and William P. Hickey ABSTRACT: A fire-resistant paint comprising a paint vehicle having uniformly dispersed throughout a powdered glass and a powdered blowing agent for the glass. Films of the paint not only provide a normal protective and decorative function, but remain in position when exposed to temperatures above the softening point of the glass to be transformed into a layer of foamed glass which thereafter acts as a heat insulation.

FIRE-RESISTANT PAINT

CROSS-REFERENCES TO RELATED APPLICATIONS

The present application is a continuation-in-part of my copending application Ser. No. 583,064 filed Sept. 9, 1966, now abandoned, which in turn is a continuation-in-part of application Ser. No. 378,216 filed June 26, 1964 now abandoned, which in turn is a continuation-in-part of the then copending application Ser. No. 132,827 filed Aug. 21, 1961, now abandoned.

BACKGROUND OF THE INVENTION

The present invention relates to a coating material which will protect surfaces on which it is applied from high temperatures; and more particularly, to a paint which swells up into a heat barrier when exposed to fire.

The principal object of the present invention is the provision of a new and improved coating material which will act as a heat barrier when subjected to high temperatures.

Another object of the invention is the provision of a new and improved decorative paint having the decorative value, moisture resistance, light-reflective values, and other characteristics of paints and which will expand into a heat barrier many times its original thickness when it is exposed to flame or high temperature.

Further objects and advantages of the invention will become apparent to those skilled in the art to which it relates from the following description of several preferred embodiments, hereafter described in detail.

SUMMARY OF THE INVENTION

According to the invention, it has been discovered that a fire-resistant paint can be prepared by incorporating a foamable mixture of powdered glass and blowing agent into a paint or film former, either oil base or water base. When such a material is applied to a surface and the coated surface is subjected to a flame, the paint or film former slowly disintegrates while the glass material is foamed and fused together to effect a heat barrier. The fused glass is foamed into a monolithic layer of foam having a thickness of between three and fifteen times the original thickness of the paint, or more, to provide a heat barrier that is particularly heat resistant. In the preferred foamable compositions, sulfates which liberate $SO_2$ are used as the blowing agent to produce a glass foam which entraps the $SO_2$ gas. Sulfur dioxide has a very low K value, and is an excellent heat barrier, and the glass will, of course, withstand temperatures of from 1,700° to 2,000° F. or more. It has been found that a normal paint provides a film which adequately supports the foamable glass materials in situ while they are being fused and while they are being foamed, even though a temperature is required for the fusing and foaming that is above the thermal decomposition temperature of the paint film former. What is more, the foamed glass composition is retained on the surface to which the paint was applied even after all of the film former has been destroyed. The glass composition need not be a low-melting glass composition, and a thermal-resistant paint can be made from substantially any type of glass as for example, bottle glass, E glass, S glass, etc. An excellent foamable composition consists of 100 parts* of glass E**, 0.5 parts of an opacifier such as aluminum flake, 1.5 parts of anhydrous calcium sulfate, and 1.5 parts of barium sulfate. The foamable composition can be substituted for part or all of the pigment and for inert material of any paint formulation having a consistency which suits the method by which the formulation is to be applied. In the case of hotmelt paints, no solvent may be necessary, while for thin sprayable paints, the formulation may comprise as much as 75 percent of solvent or volatile vehicle.

All of the constituents of the foamable composition are in a powdered form, all finer than about 50 mesh, U.S. Sieve Series, and substantially all being finer than 200 mesh. The aluminum flake is preferably −325 mesh in its entirety. It will be noted that this composition is principally glass. This is an important consideration, because the glass is of uniform, consistent quality, so that the foam produced is of uniform and consistent quality. It has been found that foamed glass so produced is unexpectedly effective in improving the thermal insulation properties of coatings with which they are used.

*The terms "percent" and "parts" are used herein and in the appended claims to refer to percent and parts by weight, unless otherwise indicated.

**Glass E has substantially the following chemical analysis in percent:

| | |
|---|---|
| $SiO_2$ | 54.6 |
| $Al_2O_3$ | 14.3 |
| $CaO$ | 17.4 |
| $MgO$ | 4.8 |
| $B_2O_3$ | 7.5 | and less than ½ percent of each of the following:

$F_2$
$R_2O$ ($Na_2O$, $K_2O$)
$Fe_2O$
$TiO_2$
$ZnO$

It will be appreciated that the calcium sulfate and the barium sulfate are used merely as blowing agents, and are useful because they release gases at a temperature range wherein the particular glass identified above has a viscosity characteristic suitable for cellulation or foaming. The aluminum apparently acts as a nucleating agent. Very fine powders of other materials which do not melt at the softening temperature of the glass, can also be used as nucleating agents. Suitable examples are −325-mesh powders of titanium dioxide, zircon, chromium oxide, and other commonly used paint pigments. The fine particles of nonmelting material act as seeds about which the blowing agents accumulate to produce an extremely large number of gas bubbles. It will also be appreciated that various other glasses could be used in place of glass E, and with the same blowing agents if those glasses have the same high-temperature viscosity characteristics as glass E, or with a different blowing agent or blowing agent composition if, as is more likely to be the situation, the high-temperature viscosity characteristics are significantly different. S glass is particularly suited for use as a foamable glass for this service. In this instance, as is true in the formulation presented above, the blowing agent or blowing-agent composition would be required to be one which releases gases over a temperature range at which glass had the required viscosity characteristics. For example, foams have been produced from finely ground soda lime glass, and one-tenth percent of 100-mesh silicon carbide plus three-quarter percent of sodium carbonate. Increasing the percentages of both the silicon carbide and the sodium carbonate by as much as 50 percent may be desirable in some instances. The above materials will produce a foam when exposed to 1,900° F. for about 3 minutes. The foam which is produced using a sulfate salt as a blowing agent is filled with sulfur dioxide gas which has a very low heat transfer coefficient. With some compositions of glass, it is possible to use powdered zinc or metallic mercury as a blowing agent. The glasses which are used with these metallic blowing agents must have softening points below the vaporization point of the metal. Mixtures of the powdered glass and metal are heated together to cause a softening of the glass; and a subsequent increase in temperature then causes the metals to vaporize to cause a foaming of the glass.

DESCRIPTION OF THE PREFERRED EMBODIMENTS

By way of specific examples, the following are given:

EXAMPLE 1

An R–1 acoustical board having a density of approximately 11 pounds per cubic foot and consisting of randomly oriented glass fibers bonded together at points of contact by a cured phenol-formaldehyde resole binder comprising 12 parts resin, 6.8 parts 325-mesh asbestine, and 1.7 parts titania was surface coated with a paint of the following composition: 1 part of a standard white paint used to commercially coat the acoustical board, and 1 part standard E glass foamable batch. The standard white paint had the following composition:

| | |
|---|---|
| Water | 2,130 parts |
| Polyvinyl acetate (8% solution) | 775 parts |
| Phenylmecuric acetate | 13.5 parts |
| Carboxy methylcellulose | 5 parts |
| Titanium dioxide pigment | 200 parts |
| Aluminum silicate | 250 parts |
| Talc | 1,450 parts |
| Wollastonite | 800 parts |
| 325-mesh silica | 1,000 parts |

The E glass foamable composition consisted essentially of 20 parts −325-mesh E glass, 0.3 part −325-mesh $BaSO_4$, 0.3 part −325-mesh $CaSO_4$, 0.1 part −325-mesh aluminum. The above paint and foamable composition was thoroughly mixed and applied to the surface of the acoustical board at a rate of approximately 50 grams per square foot. Normally two coats of paint are given acoustical tile of the above-described type, and since the above foamable mixture is not as white as the finished paint by itself, a top coat of the standard paint given above was applied over the top of the above-described foamable composition. The coated acoustical board was used as part of the ceiling in a simulated Full Scale National Board of Fire Underwriters Test UL–263 (ASTM-E19, NFPA 251). The temperature inside the furnace is normally approximately 1,850° F. and the painted surface of the tile tested as above described was exposed to this temperature for approximately 3½ hours before the tile physically caved into the furnace.

Acoustical board of the same type above described, but having only two coats of the conventional white paint given above when tested in the same conditions, caved into the furnace in approximately an hour and 30 minutes. The foamable composition expanded into a thickness of approximately three thirty-seconds of an inch at an early stage of exposure to the high temperature of the furnace, and remained on the surface of the acoustical board throughout the test excepting for a few areas where spauling was noted. It was in these areas that failure of the acoustical board occurred.

EXAMPLE 2

A paint was prepared in accordance with the mixing procedure of example 1 excepting that S glass was substituted for the E glass and a blowing agent having higher dissociation temperature was used. S glass comprises approximately 65 percent silica, approximately 25 percent alumina, approximately 10 percent $MgO$, and is otherwise substantially devoid of other oxides. This paint was applied to the acoustical board as described in example 1, and its fire-resistant properties exceed that of the board in example 1 in that it can withstand higher flame temperatures.

EXAMPLE 3

A gypsum wallboard was prepared by applying the paint of example 1 to the top surface of a sheet of paper the bottom surface of which forms the exposed surface of a gypsum wallboard. Thereafter a slurry of gypsum hemihydrate was spread upon the paint and another layer of paper was placed on top of the gypsum slurry and squeezed to provide a total thickness of one-half inch. This gypsum wallboard was allowed to set and dry to provide a wallboard of the type commonly known as dry wall. A flame when allowed to impinge upon the exposed surface of the board, causes the outer layer of paper to burn and thereby expose the layer of paint previously referred to. The paint foams in the area contacted by the flame and the area beneath the foam shows no signs of cracking or damage. A similar board, but which does not contain the inner layer of paint adjacent the gypsum, cracks and shrinks under the same conditions.

EXAMPLE 4

The paint of example 1 was applied to corrugated galvanized sheet steel and was allowed to dry. A flame caused to impinge upon the painted corrugated sheet steel causes the paint to foam and build up a heat barrier which protects the steel. A considerably greater length of time is required for the corrugated steel backing to reach the same temperature which occurs when unpainted corrugated steel is subjected to the same flame conditions. The painted corrugated sheet steel, therefore, provides improved fire resistance when used as a covering for wood and other destructible materials.

EXAMPLE 5

A commercial rock wool insulation board was coated in the same manner as the acoustical board of example 1. The fire resistance of the rock wool board was increased in a like proportion.

The following is an organic paint formulation having the fire-resistant properties of the present invention.

EXAMPLE 6

A gum vehicle is made from the following materials:

| Ingredients | Parts by Weight |
|---|---|
| East India Batu gum | 78 |
| China wood oil | 223 |
| Toluol | 300 |

A pigment is made from the following materials:

| | |
|---|---|
| E glass −325 mesh | 60 |
| Silica flour | 0.5 |
| Anhydrous calcium sulfate | 1 |
| Barium sulfate | 1 |
| Zinc oxide | 17.5 |

The paint is made by mixing 40 to 35 parts of the gum vehicle, with 60 to 65 parts of the above pigment. This material can be applied to any of the products given above, or to other wood or metal surfaces including steel supporting structures to provide a measure of fire resistance. The paint when exposed to a temperature above approximately 1,900° F. foams in situ and stays in place to provide a heat barrier.

EXAMPLE 7

A particularly useful paint formulation for coating on metal surfaces such as steel beams, is provided by incorporating from ½ to 5 percent of mineral fibers, having a softening point above that of the glass into the paint. The fibers should have a length of ⅛ to 1 inch long and preferably from ¼ to ½ inch long. The fibers can be any high-temperature inorganic fiber such as chopped rock wool, asbestine, Refasil, S glass, Fiberfrax, Kaowool, etc., so long as the fibers have a softening point above that of the foamable glass. By way of example, two parts of chopped rock wool fibers ½-inch long is substituted for two parts of the E glass in the paint formulation of example 6.

EXAMPLE 8

The following is a white paint having good fire-resistant properties:

| Ingredients | Parts by Weight |
|---|---|
| E glass −325 mesh | 24 |
| Zinc oxide | 24 |
| Asbestine fibers— ½-inch long | 6 |
| Anhydrous calcium sulfate | 1.5 |
| Barium sulfate | 1.5 |
| Aluminum flake | 0.5 |
| Lithopone filler | 2.5 |
| Alkali-refined linseed oil | 30.9 |
| Kettle-bodied linseed oil | 2.5 |
| Turpentine | 6.6 |

In general, oil base paints for brushing applications will usually comprise from 33 percent vehicle (resin and thinner) to 58 percent vehicle, and from 42 percent pigment to 67 percent pigment.

EXAMPLE 9

The following is an example of a vinyl acrylic latex paint embodying the present invention:

| Ingredients | Parts by Weight |
|---|---|
| Water | 133 |
| Ethoxylated castor oil (defoamer) | 2.5 |
| Potassium tripolyphosphate (water softener) | 1.0 |
| Sodium salt of condensed sulfonic acid (dispersant) | 6.0 |
| Polyglycol ester (emulsifier) | 4.0 |
| Ethylene glycol (freezing and thaw stabilizer) | 30.0 |
| E glass, −325 mesh | 200 |
| $TiO_2$ (pigment) | 75 |
| Carbitol acetate (thickener) | 8.0 |
| Hydroxyethyl cellulose 1.5% solution (thickener) | 300 |
| Clay | 145 |
| Barium sulfate | 15 |
| Anhydrous calcium sulfate | 15 |
| Vinyl acrylic copolymer (55% solids) (National Starch Resyn 2345) | 222 |

EXAMPLE 10

The following is an acrylic latex paint embodying the present invention:

| Ingredients | Parts by Weight |
|---|---|
| Water | 202 |
| Potassium tripolyphosphate (water softener) | 0.9 |
| Sodium salt of condensed sulfonic acid (dispersant) | 3 |
| Alkylaryl ether (wetting agent) | 1.9 |
| Ethoxylated castor oil (defoamer) | 1.8 |
| Hydroxyethyl cellulose solution 2.5% solids | 131.6 |
| Hexylene glycol (freeze-and-thaw stabilizer) | 28 |
| Ethylene glycol (freeze-and-thaw stabilizer) | 23.3 |
| Phenylmercuric acetate (preservative) | 23.3 |
| E glass, −325 mesh | 265 |
| Titanium dioxide | 163 |
| Silica flour | 46.6 |
| Sodium carbonate (glass-foaming agent) | 37.3 |
| Acrylic resin emulsion (47% solids) | 280 |
| VM & P Naptha (defoamer) | 0.9 |

EXAMPLE 11

An alkyd latex paint is made from a 55 percent solids emulsion, the resin of which is produced by reacting 1 mol phthalic anhydride, 1 mol maleic anhydride, and 2.3 mols of linseed oil, to an acid value of 40. The emulsion is made by adding an emulsifier and water and subjecting the mixture to agitation, according to known techniques. This material is substituted for the vinyl acrylic copolymer emulsion of example 9 to produce an alkyd base paint having the fire protection properties of the present invention. Other formulations can be made by substituting more of the E glass for the silica, clay, or other pigments in any of the above formulations. Still other types of fire-resistant paints can be made by substituting the foamable glass batch for at least a part of the pigments of any other type of paint formulation, as for example, a nitrocellulose lacquer, a urea and melamine formaldehyde enamel, a hotmelt enamel, etc.

The paint formulations of the present invention will usually consist of the following in percent by weight:

| | |
|---|---|
| Organic resinous film former | 6–29 |
| Powdered glass preferably less than 50-mesh | 20–67 |
| Glass-nucleating agent, or paint pigment | 0.1–47 |
| Inorganic glass-blowing agent | 0.50–5 |
| Solvent | 0–75 |

It will be apparent that where the paint is to be a hotmelt paint, that substantially no solvent is necessary; and that where an exceedingly thin paint for spraying or soaking into a porous surface is required, up to approximately 75 percent solvent can be used particularly where a gelling or thickening agent is used, as for example in a water base paint. Short lengths of inorganic fibers, as for example, rock wool, asbestine, pure silica fibers, as for example, Refasil fibers, S glass fibers, etc. can be incorporated into the paint to increase the retaining power of the film during exposure to fire. Any type of inorganic blowing agent which produces a gas at a temperature just above the softening point of the glass can be used. In general, two types will be found useful, the first of which is the sulfate type, and the second of which is the carbonate type. Any cation of the carbonate or sulfate can be used which produces a salt that decomposes at a temperature that is sufficiently above the softening point of the glass that the cell walls of the molten glass are retained. Suitable examples of carbonates for use with E glass are: sodium carbonate, potassium carbonate, calcium carbonate, etc. Suitable examples of the sulfates are: calcium sulfate, barium sulfate, magnesium sulfate, etc. Any of the pigments which do not decompose will act as a nucleating agent for the gases which are released during the glass-blowing operation. Any organic resinous film former which polymerizes to a generally impervious film around the paint pigments and fillers, including the glass and blowing agents, can be used to hold the glass pigments and blowing agents in position during exposure to fire and during the softening and cellulation of the glass. Organic materials which are not resinous polymeric materials and therefore form water-softening films, such as sugars, starches, etc. or film-forming materials which are not used in a sufficient quantity to be impervious to water, allow oxidation to take place at the base of the film, and the film attachment destroyed during exposure to fire. In addition, a nonfilm-forming organic material allows separation of the particles of glass and blowing agent and the escape of the gases produced by the glass-blowing agent, so that the gases are not available for blowing molten glass that may be produced during exposure to the fire.

It will be apparent that there has been provided a new and improved paint or coating material which has the convenience of being applied by the usual painting techniques to substantially any type of surface and which will provide appreciable heat and fire resistance to the surface that has been coated.

While the invention has been described in considerable detail, I do not wish to be limited to the particular embodiments that have been described, and it is my intention to cover hereby all novel adaptations, modifications, and arrangements thereof which come within the practice of those skilled in the art to which the invention relates.

I claim:

1. In a fire-resistant paint composition comprising an organic resinous paint vehicle, an inorganic pigment, and a fire-retardant agent, the improvement comprising: the inclusion therein as a fire-retardant agent of the following mixture in percent by weight: from 20 to 67 percent of powdered glass of less than 50-mesh particle size, from 0.1 to 47 percent of an inert inorganic powdered pigmentary glass-nucleating agent, and from 0.5 to 5 percent of a glass-blowing agent from the group consisting of powdered zinc, metallic mercury, calcium sulfate, magnesium sulfate, barium sulfate, sodium carbonate, calcium carbonate and potassium carbonate, said composition being capable upon drying of forming a continuous organic protective film encasing and retaining the solid ingredients, and of forming a glass foam in situ when heated above the softening point of the glass.

2. The paint of claim 1 wherein said powdered blowing agent is an inorganic sulfate.

3. The paint of claim 1 wherein said glass is S glass comprising approximately 65 percent silica, approximately 25 percent alumina, and approximately 10 percent MgO.

4. The paint of claim 2 wherein said glass is S glass comprising approximately 65 percent silica, approximately 25 percent alumina, and approximately 10 percent MgO.

5. The paint of claim 1 including from ½ to 5 percent by weight of inorganic fibers from the group consisting of rock wool fibers, asbestine fibers, silica fibers and glass fibers having a softening point above that of the glass.